Dec. 10, 1963  J. HARGREAVES  3,113,372
CUTTING TOOLS FOR USE IN LATHES OR OTHER MACHINES
Filed Jan. 12, 1962

United States Patent Office 3,113,372
Patented Dec. 10, 1963

3,113,372
CUTTING TOOLS FOR USE IN LATHES OR OTHER MACHINES
James Hargreaves, Finham, Coventry, England, assignor to Wickman Limited, Coventry, England
Filed Jan. 12, 1962, Ser. No. 165,768
Claims priority, application Great Britain Jan. 16, 1961
4 Claims. (Cl. 29—96)

This invention relates to cutting tools for use in lathes or other machines, and of the kind comprising a holder, a cutter of hard metal supported on the holder, a chipbreaker supported on the cutter, a clamping plate for holding the cutter and chipbreaker in position, and a screw engaging the holder for securing the clamping plate.

When such a tool is in use, and it is required to detach the cutter for changing the position of its cutting edge or replacement, without disconnection of the holder from the machine, the screw acting on the clamping plate is retracted sufficiently to release the cutter. A risk then sometimes exists of the chipbreaker accidentally falling away from the holder and being lost in the bed of the machine.

The object of the present invention is to provide a tool of the kind above specified in an improved form, whereby the said risk is eliminated.

According to the invention in or for a tool of the kind aforesaid a clamping plate having in its inner face a shallow recess for accommodation of the chipbreaker, the recess being flanked by parallel side edges one at least of which is undercut for engagement by a complementary edge on the chipbreaker, and a stop piece for preventing accidental loss of the chipbreaker.

Figure 1:
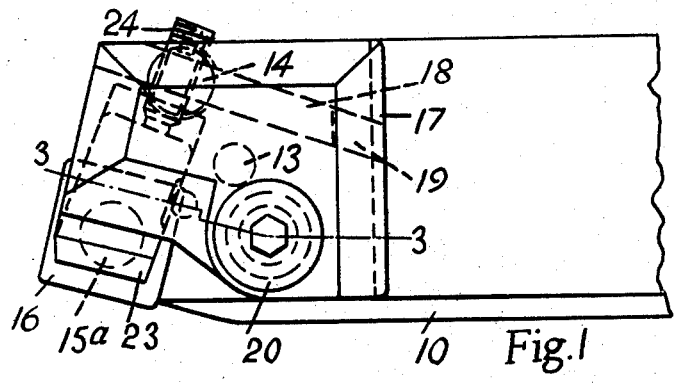
Figure 2:
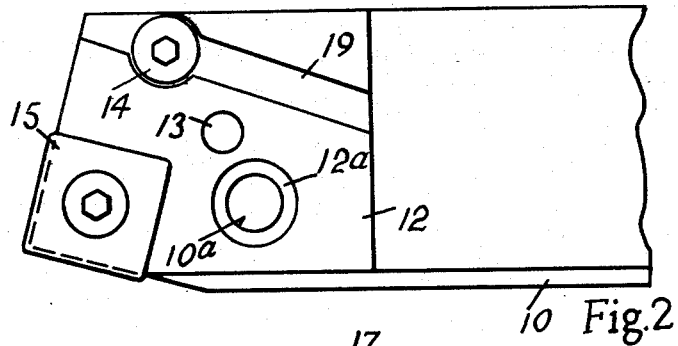
Figure 4:
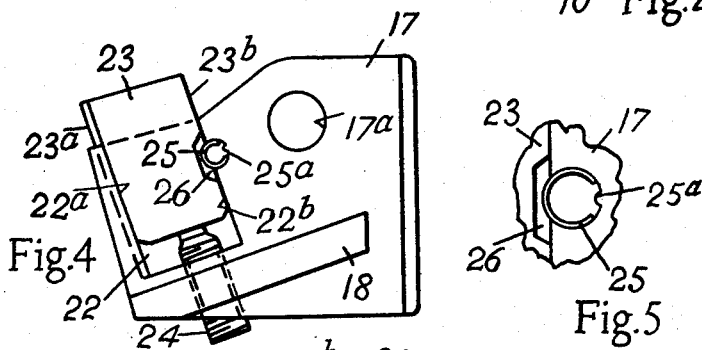
Figure 5:
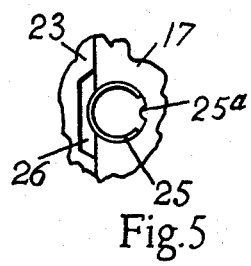
Figure 3:
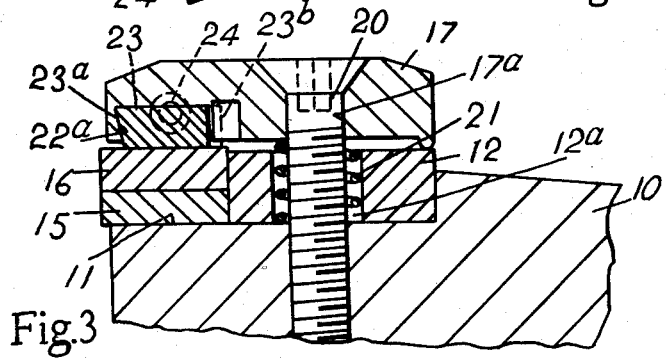

In the accompanying drawings, FIGURE 1 is a plan view for an example of the invention designed for use in a lathe. FIGURE 2 is a similar view to FIGURE 1 except that the clamping plate and chipbreaker are removed, FIGURE 3 is a section on the line 3—3 of FIGURE 1, FIGURE 4 is a view of the face of the clamping plate presented to the holder, showing the chipbreaker in position, and FIGURE 5 is a fragmentary view to an enlarged scale of part of FIGURE 4.

Referring to the drawings, the tool shown there comprises a holder 10 having a step 11 at its forward end, and on the step 11 is a cutter supporting plate 12 which is located by a dowel pin 13 secured in the holder 10, and is secured to the holder by means of a screw 14 (see FIGURE 2). If desired, however, the holder 10 and plate 12 could be formed integrally. At one corner of the plate 12 is formed a substantially rectangular or other notch for reception of a correspondingly shaped hard metal under-plate 15 (secured to the holder 10 by a screw 15a) and a similarly shaped hard metal cutter 16 having a plurality of cutting edges. A clamping plate 17 is located on the plate 12 by means of an integral rib 18 which engages a complementary groove 19 in the plate 12 and is secured by a screw 20 which passes through a hole 17a in the clamping plate and a larger hole 12a in the plate 12 into a screw-threaded hole 10a in the holder 10. Also (as shown) in the hole 12a may be placed a coiled spring 21 adapted to raise the clamping plate 17 when the screw 20 is retracted.

The inner face of the clamping plate 17 has formed in it a shallow recess 22 which is open at one edge of the plate. The recess 22 is flanked by a pair of straight side edges 22a, 22b which are parallel to each other. At least one of these edges is undercut (as 22a in FIGURE 3) in the manner of a half-dovetail for engagement by a complementary bevelled edge 23a on a chipbreaker 23. Preferably (as shown), although not exclusively, the other edge of the recess 22 is square with the base of the recess, and the corresponding edge 22b of the chipbreaker 23 is similarly shaped. The chipbreaker may (as shown) be longitudinally adjustable by a self-locking screw 24 carried by the clamping plate 17 and arranged to act on the rear end of the chipbreaker. The edge 22b of the recess 22 is intersected by a small hole in which is inserted a stop piece. This piece (as shown in FIGURE 5) is conveniently formed by bending a small piece of flexible metal strip 25 to a cylindrical form and then inserting it in the hole, an abutment 25a being provided in the hole between the edges of the strip to prevent angular movement of the cylinder. By co-operation with a recess 26 in the adjacent edge of the chipbreaker, the stop piece 25, in conjunction with the co-acting edges 22a, 23a serves to prevent accidental loss of the chipbreaker when the clamping plate 17 is relaxed. However, the resilience of the strip 25 will admit of the chipbreaker being withdrawn in a longitudinal direction for service or replacement. In an alternative construction the stop piece may be carried by the chipbreaker and arranged to co-operate with the adjacent edge of the recess in the clamping plate.

The arrangement is such that when the clamping screw 20 is tightened the chipbreaker 23 and cutter 16 are securely held between the clamping plate 17 and the under plate 15. When it is required to change the position of the cutter for bringing another of its edges into use, or to replace the cutter by a new one, the clamping screw is retracted for releasing the cutter. The clamping plate then carries the chipbreaker with it as it is held against detachment by its engagement with the clamping plate.

The invention is applicable in essentially the same manner to tools for use in other machines, such as planing machines. Also it is applicable in essentially the same manner to rotary milling cutters consisting of a body part adapted for the attachment thereto of a plurality of cutters.

Having thus described my invention what I claim as new and desire to secure by Letters Patent is:

1. A cutting tool holder comprising in combination a body adapted to support a hard metal cutter, a clamp, a screw engaging the body and clamp and actuable to move the clamp between an operative position in which it holds a cutter in position on the body, and an inoperative position in which the clamp is spaced from said cutter, a recess in the face of said clamp presented to the cutter, said recess being flanked by parallel side edges one of which is undercut, a chipbreaker having a complementary edge engaged with said one side edge of the recess, a pair of recesses formed in the other of said parallel side edges and in the adjacent edge of the chipbreaker respectively, and a resilient stop secured within one of said pair of recesses and entering the other of said pair of recesses, said resilient stop comprising a sheet metal plate bent to the form of a split cylinder, said undercut edge and said resilient stop serving in combination to prevent accidental loss of the chipbreaker, and resilience of said stop permitting withdrawal of the chipbreaker in the direction of said one side edge.

2. A cutting tool holder comprising in combination a body adapted to support a hard metal cutter, a clamp, a screw engaging the body and clamp and actuable to move the clamp between an operative position in which it holds a cutter in position on the body, and an inoperative position in which the clamp is spaced from said cutter, a recess in the face of said clamp presented to the cutter, said recess being flanked by parallel side edges one of which is undercut, a chipbreaker having a complementary edge engaged with said one side edge of the recess, a pair of recesses formed in the other of said parallel side edges and in the adjacent edge of the chipbreaker respectively, and a resilient stop secured within the recess in said clamp and entering the recess in said chipbreaker, said resilient stop comprising a sheet metal plate bent to the form of a split cylinder, said undercut edge and said resilient stop serving in combination to prevent accidental loss of the chipbreaker, and the resilience of said stop permitting withdrawal of the chipbreaker in the direction of one side edge.

3. A cutting tool holder comprising in combination a body adapted to support a hard metal cutter, a clamp, a screw engaging the body and clamp and actuable to move the clamp between an operative position in which it holds a cutter in position on the body, and an inoperative position in which the clamp is spaced from said cutter, a spring urging said clamp towards the inoperative position, a recess in the face of said clamp presented to the cutter, said recess being flanked by parallel side edges one of which is undercut, a chipbreaker having a complementary edge engaged with said one side edge of the recess, a pair of recesses formed in the other of said parallel side edges and in the adjacent edge of the chipbreaker respectively, a resilient stop secured within the recess in the clamp and entering the recess in the chipbreaker, said resilient stop comprising a sheet metal plate bent to the form of a split cylinder, and an abutment secured to the clamp and entering the split between the ends of said cylinder to prevent angular movement of said resilient stop, said undercut edge and resilient stop serving in combination to prevent accidental loss of the chipbreaker, and resilience of said stop permitting withdrawal of the chipbreaker in the direction of said one side edge.

4. A cutting tool holder as claimed in claim 3, including a screw carried by said clamp acting on the chipbreaker to permit adjustment of the chipbreaker in the direction of said undercut edge.

References Cited in the file of this patent

UNITED STATES PATENTS

| | | |
|---|---|---|
| 2,181,023 | Moore | Nov. 21, 1939 |
| 2,211,596 | Darash | Aug. 13, 1940 |
| 2,860,402 | Proksa | Nov. 18, 1958 |
| 2,911,707 | Almen | Nov. 10, 1959 |